Patented Feb. 20, 1951

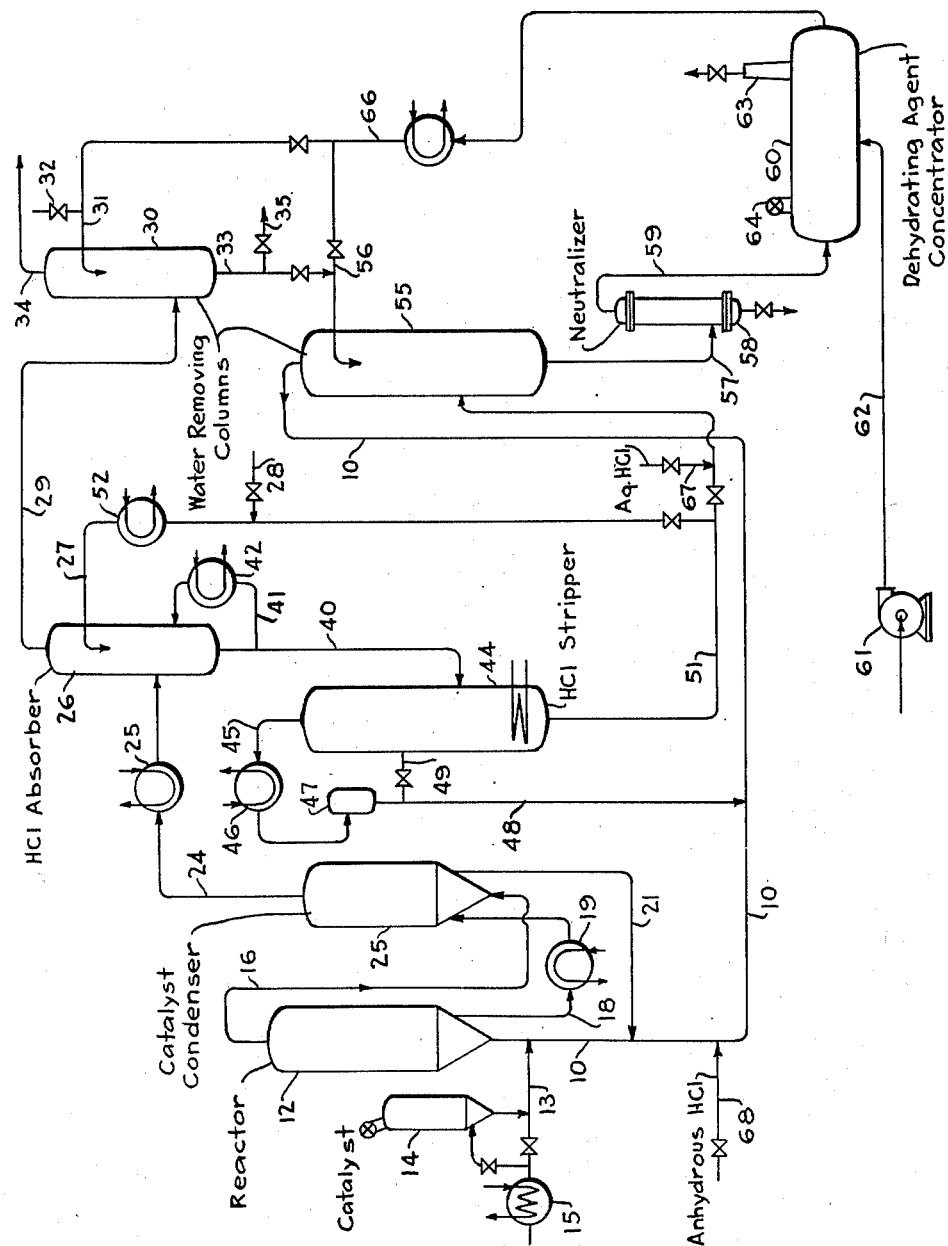

2,542,961

UNITED STATES PATENT OFFICE 2,542,961

CHLORINE PRODUCTION

Ava J. Johnson, Oakland, and Alexander J. Cherniavsky, San Francisco, Calif., assignors to Shell Development Company, San Francisco, Calif., a corporation of Delaware Application November 8, 1948, Serial No. 58,828

3 Claims. (Cl. 23—219)

This invention relates to improvements in the execution of catalytic processes wherein chlorine is produced by the oxidation of hydrogen chloride. The invention relates more particularly to improvements in the manufacture of chlorine by the oxidation of hydrogen chloride in the presence of a halide of a metal of variable valence.

Hydrogen chloride is produced as a by-product in a great number of processes. Often, its production exceeds the need for this undesired product. Not only does the conversion of more valuable charge material to this undesired product detract materially from economical operation of the process on a practical scale but presents serious disposal problems. An economical source of chlorine, on the other hand, is generally in considerable demand. Often processes producing hydrogen chloride themselves employ chlorine as a starting material. Methods enabling the more economical production of chlorine from available hydrogen chloride are therefore of great value to the industry.

A method disclosed heretofore for the production of chlorine from hydrogen chloride comprises bringing the hydrogen chloride into contact with a halide of a metal of variable valence in the presence of an oxygen-containing gas at an elevated temperature thereby forming reaction products including chlorine and water. The method may be represented by the overall formula:

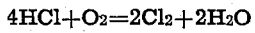

$$4HCl + O_2 = 2Cl_2 + 2H_2O$$

Economical operation of such a process is generally dependent to at least a substantial degree upon the efficiency with which separation of individual components from the reactor effluence can be accomplished. Difficulties, generally necessitating recourse to complex and costly operational procedures in process available heretofore, is occasioned by the fact that the reactor effluence comprises gaseous components, such as chlorine and hydrogen chloride, which must be separated from one another, as well as water which forms an azeotrope with hydrogen chloride. The reactor effluence will generally comprise a considerable amount of unconverted hydrogen chloride and economical operation of the process requires that it be returned to the reaction zone. Since water is also a product of the reaction its constant separation from such recycled hydrogen chloride must be resorted to. Removal of water from hydrogen chloride within the system is, however, essential not only to eliminate water formed during the reaction but avoid the passage of inordinately large volumes of material through the reaction zone and other parts of the system. Hydrogen chloride which contains only a relatively small amount of water is generally considerably more corrosive than more dilute hydrogen chloride. It is therefore essential to efficient operation that substantially complete water removal be accomplished economically within the system. When resorting to the use of a fluidized catalyst system the ability to effect substantially complete removal of the water is often of particular importance since hydrogen chloride is employed as a means to effect the transportation of fluidized catalysts within portions of the equipment in which water is generally excluded. Since the hydrogen chloride-water azeotrope contains a considerable proportion of water and hydrogen chloride feed is generally available in the aqueous form, it is generally highly desirable to effect the removal of water from the hydrogen chloride feed prior to its passage to the reaction.

It is an object of the present invention to provide an improved process enabling the more efficient production of chlorine by the oxidation of hydrogen chloride.

In accordance with the invention, hydrogen chloride is contacted with oxygen in a reaction zone in the presence of a chloride of a metal of variable valence under hydrogen chloride oxidizing conditions thereby forming reaction products comprising chlorine and water. Effluence from the reaction zone comprising chlorine, hydrogen chloride and water, is contacted with a hydrogen chloride absorbing medium consisting of a cooled stream of aqueous hydrogen chloride in a hydrogen chloride absorbing zone, thereby absorbing substantialy all of the hydrogen chloride content of said reactor effluence in the aqueous hydrogen chloride stream. The gaseous portion of the reactor effluence remaining uncondensed and unabsorbed and consisting essentially of chlorine free from any substantial amount of hydrogen chloride is passed from the hydrogen chloride absorbing zone to a suitable chlorine dehydrating zone wherein water is removed therefrom by contact with a dehydrating agent. The aqueous hydrogen chloride absorbing medium enriched with the absorbed hydrogen chloride is passed from the hydrogen chloride absorbing zone to a hydrogen chloride stripping zone. Within the stripping zone a vapor overhead consisting essentially of anhydrous hydrogen chloride is separated from a liquid bottoms consisting essentially of aqueous hydrogen chloride. A part of the liquid bottoms are passed from the stripping zone to the hydrogen chloride absorbing zone to be used as the absorbing medium therein. The remainder of the liquid bottoms formed in the stripping zone are passed to an extractive distillation zone wherein they are subjected to extractive distillation in the presence of an auxiliary solvent having a greater affinity for water than for hydrogen chloride under extractive distillation resulting in the formation of a vapor overhead consisting essentially of anhydrous hydrogen chloride. The substantially anhydrous chloride overhead from the extractive distillation zone is passed to the reaction zone.

In a preferred modification of the invention the auxiliary solvent employed in the extractive distillation zone is first introduced into the chlorine dehydrating zone to function as the chlorine dehydrating agent therein before being passed to the extractive distillation zone.

In order to set forth more fully the nature of the invention it will be described in detail herein with reference to the attached drawing wherein the single figure represents a more or less diagrammatical elevational view of one form of apparatus suitable for executing the process of the invention.

Anhydrous hydrogen chloride, or an anhydrous hydrogen chloride-containing gas, is passed through line 10 into a reaction zone. The reaction zone may comprise a chamber type of reactor 12. Oxygen is introduced into the system by means of line 13 leading into line 10 passing into reactor 12. The oxygen thus introduced into the system may consist essentially of oxygen or may consist of an oxygen-containing gas, such as air. Within reactor 12 the admixed hydrogen chloride and oxygen are contacted with a contact mass comprising as the essential activating ingredient a chloride of a metal of variable valence. Suitable metal chlorides comprise the chlorides of a metal of the first transition series of the elements of the periodic table, that is, the chlorides of a metal having an atomic number of from 21 through 30, both inclusive. These suitable metals comprise titanium, vanadium, chromium, manganese, iron, cobalt, nickel and copper. Of these metals iron and copper are preferred. Particularly preferred contact materials comprise those containing a chloride of copper as the active ingredient. In addition to the metal chlorides of the first transition series, the contact materials employed may contain suitable promoting or activating agents such as, for example, a chloride of cadmium, tin, antimony, the alkali and alkaline earth metals, and the like. The metal chloride employed may be used as such or comprise suitable support or diluent materials such as, for example, adsorptive materials of silicious and/or aluminous character and of synthetic or natural origin. Particularly preferred support or diluent materials comprise alumina, silica, magnesia, silica-alumina, carbon, fuller's earth and the like.

In a preferred method of executing the invention, the contact mass comprising the metal chlorides, is employed in the fluidized state. Particularly preferred fluidized contact masses comprise a finely divided aluminous material impregnated with copper chloride. The contact mass is maintained in the fluidized or suspended state within the reaction zone by the gaseous reactants themselves. Optionally additional inert gas may be introduced into the system by means not shown in the drawing.

Although the use of a finely divided catalyst in the fluidized state is preferred, it is to be understood that the invention is in no wise limited in its application to processes effecting the hydrogen chloride oxidation with catalysts of this type. Thus the invention may be applied to processes wherein the oxidation of the hydrogen chloride is effected with the aid of conventional hydrogen chloride oxidation catalysts employed in the form of solid beds or in the form of molten fluids. Though but one reactor is shown in the drawing, it is to be understood that two or more reactors, connected in series or parallel flow, may suitably be employed. Such reactors may comprise conventional reaction zones of the type disclosed as suitable for the execution of the hydrogen chloride oxidation, including those wherein two separate reactors are employed to effect the hydrogen chloride oxidation with the aid of the solid bed type of catalysts.

The finely divided catalyst is introduced into the system from a suitable source, for example, a catalyst storage drum 14, discharging into line 10.

The temperature within reactor 12 is maintained in the range of from about 300° C. to about 600° C. and preferably from about 400° C. to about 500° C. Subatmospheric, atmospheric or superatmospheric pressures may be maintained within reactor 12. The use of a slightly superatmospheric pressure ranging, for example, from about 5 to about 50 pounds gauge is generally preferred. The rate of hydrogen chloride introduction into the reaction zone is controlled to maintain a stoichiometrical excess of hydrogen chloride over the oxygen passed into the reaction zone. Thus the molal ratio of hydrogen chloride to oxygen may be maintained in the ratio of from about 1.5 to about 15, and preferably from about 2 to about 7.5.

Heating means such as, for example, an indirect heat exchanger 15, and optionally other heating means such as a furnace, not shown in the drawing, are provided for providing the initial heat required in starting up the operation.

Under the above-defined conditions hydrogen chloride is oxidized in reactor 12 with the formation of reaction products consisting essentially of chlorine and water. Reaction products are eliminated from the reaction chamber 12 through line 16. Effluence from reactor 12 passing through line 16 will comprise besides chlorine and water, a substantial amount of unreacted hydrogen chloride and some entrained and volatilized catalyst. Since the reaction is highly exothermic, means are provided for the removal of excess heat from reactor 12. Removal of excess heat may be obtained by the passage of a portion of the catalyst from reactor 12 to catalyst cooling means. To this effect a portion of catalyst is continuously or intermittently withdrawn from reactor 12 and passed through line 18 provided with indirect cooling means, such as a cooler 19, into an enlarged chamber 20. Within the chamber 20 the cooled catalyst is contacted with reactor effluence emanating from reactor 12 through line 16. Contact of the cooled catalyst with the reactor effluence in chamber 20 will result in condensing volatilized catalyst and removing entrained catalyst from the reactor effluence. Cooled catalyst is returned to reactor 12 by means of line 21 leading to line 10.

A gaseous stream, comprising reaction products in admixture with chlorine, hydrogen chloride, in water, is taken from chamber 20 and passed through line 24, provided with cooler 25, into a hydrogen chloride absorbing zone. In passing through cooler 25 the stream is cooled to a temperature sufficiently low to condense substantially all the water content of the stream. The hydrogen chloride absorbing zone may comprise a scrubber 26.

Within scrubber 26 the stream comprising reaction products is brought into countercurrent contact with a cooled liquid absorbing medium, such as an aqueous solution of hydrogen chloride obtained within the system and introduced into the upper part of column 26 by means of line 27. The reaction products will comprise a ratio of hydrogen chloride to water of reaction substantially in excess of that comprised in the water-hydrogen chloride azeotrope; for not only is hydrogen chloride and water produced in substantially equimolar amounts in the hydrogen chloride oxidation reaction but a substantial excess of hydrogen chloride is generally charged to the reaction zone. Within column 26 substantially all of the hydrogen chloride introduced by means of line 24 will be absorbed by the aqueous hydrogen chloride introduced through line 27, leaving a gaseous overhead consisting essentially of chlorine free of any substantial amount of hydrogen chloride. The gaseous overhead from column 26 consisting essentially of chlorine; a minor amount of water, and any inert gases introduced into, or formed within, the system, is passed through line 29 to a suitable chlorine dehydrating zone. The amount of water contained in the overhead from column 26 will generally not exceed about 2-3% by weight. The greater part of the water entering column 26 leaving with the enriched absorbing medium. The chlorine dehydrating zone may comprise a suitable column 30 wherein the chlorine stream is brought into direct contact with a suitable dehydrating agent introduced into the column by means of line 31. Any suitable type of dehydrating agent may be employed. Suitable chlorine dehydrating agents comprise, sulfuric acid, a concentrated solution of a hygroscopic salt, such as calcium chloride, or the like. Substantially anhydrous gaseous overhead, consisting essentially of chlorine, is taken overhead from column 30 by means of line 34. The chlorine thus removed from column 30 through line 34 is passed to storage and optionally to suitable means for the removal of any inert gas therefrom, such as, for example, a low temperature distillation not shown in the drawing.

The dehydrating agent is introduced into the upper part of column 30 from an outside source by means of valved lines 32 and 31. Dehydrating agent comprising the water removed from the chlorine stream is removed from column 30 by means of line 33 and eliminated from the system by means of valved line 35.

Liquid bottoms consisting essentially of aqueous hydrogen chloride enriched with the absorbed hydrogen chloride is passed from column 27 through line 40 into a hydrogen chloride stripping zone. A part of the liquid passing through line 40 is by-passed through line 41, provided with cooler 42, and returned to the column 26 to remove heat of absorption.

The hydrogen chloride stripping zone may comprise a stripping column 44. Within column 44 the enriched aqueous hydrogen chloride stream is subjected to stripping conditions forming a gaseous overhead consisting essentially of anhydrous hydrogen chloride and liquid bottoms consisting essentially of the hydrogen chloride-water azeotrope. The aqueous hydrogen chloride bottoms will generally contain about 21% by weight of hydrogen chloride.

The substantially anhydrous hydrogen chloride is taken overhead from column 44 and passed through line 45 provided with cooler 46 into an accumulator 47. From accumulator 47 the substantially anhydrous hydrogen chloride is passed through lines 48 and 10 to reactor 12. A part of the hydrogen chloride is by-passed from line 48 through valved line 49 to column 44 as reflux.

Liquid bottoms consisting essentially of aqueous hydrogen chloride containing hydrogen chloride and water in the proportion of the azeotrope are taken from column 44 through valved line 51. A part of the aqueous hydrogen chloride stream is passed from line 51 through line 27 provided with cooler 52 to the upper part of column 26 to be used as the hydrogen chloride absorbing medium employed therein. In passing through cooler 52 the stream is cooled to a temperature sufficiently low to assure absorption of all hydrogen chloride in column 26 and condensation of any water vapor present therein. When charging aqueous hydrogen chloride to the system at least a part of such aqueous hydrogen chloride charge may be introduced into line 27 by means of valved line 28.

The remainder of the aqueous hydrogen chloride stream flowing through line 51 which is not passed to column 26 is passed to suitable water removing means. The water removing means may comprise an extractive distillation column 55. Within column 55 the aqueous hydrogen chloride stream is subjected to extractive distillation in the presence of an auxiliary solvent having a greater preference for water than hydrogen chloride. Preferred auxiliary solvents comprise the concentration aqueous solutions of a hygroscopic salt which has a vapor pressure not greater than about 8 mm. of mercury at about 20° C. Examples of such suitable hygroscopic salts are calcium chloride, calcium bromide, zinc chloride, magnesium chloride, calcium iodide, ferric chloride, and the like. Of the suitable hygroscopic salts calcium chloride is preferred. The aqueous salt solutions should preferably have a concentration of from about 10% to about 60% by weight depending upon the solubility of the particular salt employed. Calcium chloride solutions having a concentration in excess of 30% by weight, and preferably about 55% by weight, are preferably employed.

The concentrated aqueous solution of the hygroscopic salt, such as, for example, a concentrated aqueous calcium chloride solution is introduced into the upper part of extractive distillation column 55 by means of valved line 56. Within column 55 the aqueous hydrogen chloride is extractively distilled with the formation of a substantially anhydrous hydrogen chloride overhead and liquid bottoms consisting essentially of aqueous calcium chloride comprising substantially all of the water introduced into column 55 with the aqueous hydrogen chloride stream. The substantially anhydrous hydrogen chloride overhead is passed from extractive distillation column 55 through line 10 to the reactor 12.

Aqueous calcium chloride is taken from the bottom of column 55 and passed through line 57 through suitable neutralizing means, such as a drum containing calcium carbonate 58 and thence through line 59 into an auxiliary solvent concentrating means. The concentrating means may comprise a chamber 60 provided with suitable heating means, not shown in the drawing and means such as a blower 61 for the passage of a stripping gas, such as flue gas or the like, through line 62 into chamber 60. Water is stripped from the aqueous calcium chloride solution in chamber 60 and eliminated therefrom through vapor outlet 63. Fresh calcium chloride is added to the system by means of a hopper 64. Concentrated aqueous calcium chloride is taken from chamber 60 and passed through lines 66 and 56 to the upper part of extractive distillation column 55 to function as the auxiliary solvent therein.

A valved line 67 is provided for the introduction of aqueous hydrogen chloride into the system. Such aqueous hydrogen chloride may comprise a part or all of the hydrogen chloride introduced into the system from an external source. When introducing substantially anhydrous hydrogen chloride into the system this may be introduced by means of valved line 68 leading directly into line 10.

In a preferred method of carrying out the invention, the concentrated aqueous solution of a hygroscopic salt used as the auxiliary solvent in extractive distillation column 55 is first passed into column 30 to function as the chloride dehydrating agent therein prior to passing into the extractive distillation column 55. In this preferred method of operation the concentrated aqueous calcium chloride is passed from chamber 60 through valved lines 66 and 31 to the upper part of column 30. Within column 30 the stream of concentrated aqueous calcium chloride is passed countercurrent to the chlorine-containing stream passing therethrough, thereby removing substantially all water from the chlorine-containing stream. From column 30 the concentrated aqueous calcium chloride stream is passed through lines 33 and 56 into extractive distillation column 55 to function as the auxiliary solvent therein.

This modification of the invention enables efficient dehydration of the chlorine and hydrogen chloride reaction products as well as of the aqueous hydrogen chloride feed, with the use of a single stream of dehydrating agent thereby not only substantially reducing the cost of the dehydrating agents employed, but greatly simplifying equipment and operative steps involved.

The following example is illustrative of the invention:

Example

A mixture of oxygen and anhydrous hydrogen chloride containing 6.4 mols of hydrogen chloride per mol of oxygen, is contacted with a fluidized catalyst consisting of alumina impregnated with copper chloride at a temperature of 450° C. in a reactor at the rate of 9,408 pounds of the gaseous mixture per hour. 53% of the anhydrous hydrogen chloride thus charged to the reactor is recycled from within the system. The oxygen employed consists of 96% pure oxygen. The pressure within the reactor is maintained at about 2 atmospheres. 58% of the hydrogen chloride charged to the reactor is converted to chlorine per pass. Effluence from the reactor, after contacting a cooled portion of the catalyst, contains 39.6 mol per cent HCl, 27.4 mol per cent $Cl_2$, 29.8 mol per cent $H_2O$ and 1 mol per cent $O_2$. The rest of the reactor effluent consists essentially of inert gaseous material such as $N_2$, $CO_2$ and the like. The reactor effluence is cooled by indirect cooling to a temperature of 40° C. and contacted at 40° C. with a liquid stream of aqueous hydrogen chloride containing 21% by weight of HCl, in a hydrogen chloride absorbing column. The gaseous overhead from the hydrogen chloride absorbing column contains 87.1 mol per cent $Cl_2$, 3.4 mol per cent $O_2$, 3 mol per cent water and only 0.1 mol per cent HCl. The rest of the chlorine stream is composed of inert gases such as $N_2$, $CO_2$ and the like. The chlorine-containing overhead is dried by contact with sulfuric acid to result in the obtaining of 4750 pounds per hour of crude anhydrous chlorine containing 89.9 mol per cent chlorine and only about 0.1 mol per cent HCl.

Bottoms from the hydrogen chloride absorber containing 19 mol per cent HCl and 81 mol per cent water are subjected to stripping in a hydrogen chloride stripping column to result in the production of 3060 pounds per hour of substantially anhydrous HCl overhead (containing 96.05% HCl) which was recycled to the reactor. Aqueous hydrogen chloride bottoms separated in the hydrogen chloride stripping column contain 21% by weight of hydrogen chloride, the rest being water. Aqueous HCl bottoms are passed from the HCl stripping tower to the HCl absorbing tower at the rate of 17,000 pounds per hour. The remainder of the aqueous HCl from the HCl stripper bottoms (1440 pounds per hour) are passed to an extractive distillation column. 19.5° Bé, HCl from an outside source is also introduced into the extractive distillation column at the rate of 3034 pounds per hour. Within the extractive distillation column the aqueous HCl is extractively distilled in the presence of concentrated aqueous calcium chloride containing 55% by weight of calcium chloride. The concentrated calcium chloride solution is introduced into the distillation column at the rate of 24,000 pounds per hour. Substantially anhydrous hydrogen chloride (99+ mol per cent HCl) was taken overhead from the extractive distillation column at the rate of 1223 pounds per hour and recycled to the reactor. Aqueous calcium chloride-containing bottoms from the extractive distillation column contain only 0.04 mol per cent HCl. Calcium chloride containing-bottoms from the extractive distillation are neutralized by contact with calcium carbonate, then concentrated by blowing with flue gas and adding fresh calcium carbonate. The reconcentrated calcium chloride solution is recycled to the upper part of the extractive distillation column.

In a repetition of the above operation, the steps are carried out under substantially identical conditions with the exception that the gaseous overhead from the hydrogen chloride absorbing column consisting of 87.1 mol per cent $Cl_2$, 3.4 mol per cent $O_2$, 3 mol per cent water, 0.1 mol per cent HCl and inert gases are dried by contact with a stream of concentrated aqueous calcium chloride in a chlorine dehydrating column resulting in the absorption of substantially all of the water content of the chlorine stream by the aqueous calcium chloride. The resulting substantially anhydrous chlorine-containing gaseous stream and the aqueous calcium chloride streams are taken separately from the chlorine-dehydrating column. The aqueous calcium chloride stream thus taken from the chlorine dehydrating column is passed into the extractive distillation column receiving aqueous hydrogen chloride from the hydrogen chloride stripping column, to be used therein as the auxiliary solvent for the extractive distillation of the aqueous hydrogen chloride.

It is seen that the process of the invention not only enables the efficient separation of the gaseous reaction products but provides for the efficient removal of the water content not only from the reactor effluent but from aqueous hydrogen chloride feed to the system in the complete absence of any substantial loss of hydrogen chloride. The process of the invention therefore, enables operation in the absence of the passage of any substantial amount of water to the reaction zone and yet enables substantially complete conversion of all of the hydrogen chloride charged to the system to desired substantially anhydrous chlorine product with a minimum of operative steps.

For the sake of clarity in setting forth the nature of the invention, parts of apparatus such as, for example, pumps, compressors, valves, fractionators, condensers, catalyst storing means, accumulators, stills, and the like, not essential to a full and complete understanding of the invention have been omitted from the drawing.

We claim as our invention:

1. In a process wherein chlorine is produced by contacting oxygen and hydrogen chloride with a chloride of a metal having an atomic number of from 21 to 30, both inclusive, at hydrogen chloride oxidizing conditions in a reaction zone, thereby forming a reaction mixture consisting essentially of chlorine, hydrogen chloride and water, the steps which comprise cooling said reaction mixture to a temperature sufficiently low to condense substantially all of the water content of said mixture, thereafter contacting the cooled reaction mixture in an absorption zone with a cooled liquid absorbing medium consisting essentially of an azeotropic mixture of hydrogen chloride and water, thereby absorbing in said absorbing medium substantially all of the hydrogen chloride contained in said reaction mixture with the formation in said absorption zone of an enriched aqueous hydrogen chloride absorbing medium containing hydrogen chloride in excess of that of the hydrogen chloride-water azeotrope and leaving a residual gas phase consisting essentially of chlorine substantially free of hydrogen chloride but containing a small amount of water, stripping excess hydrogen chloride in anhydrous form from said enriched absorbing medium in a stripping zone, thereby leaving aqueous hydrogen chloride as liquid stripper bottoms, extractively distilling anhydrous hydrogen chloride vapor from at least a portion of said liquid stripper bottoms in an extractive distillation zone in the presence of an auxiliary solvent having a greater preference for water than hydrogen chloride emanating from within the system as described below, dehydrating said chlorine-containing gas phase formed in said absorption zone by contact with a dehydrating agent consisting essentially of a concentrated aqueous solution of a hygroscopic salt containing from about 10% to about 60% by weight of said hygroscopic salt and having a vapor pressure not greater than about 8 mm. Hg at about 20° C. in a chlorine dehydrating zone, thereby forming in said chlorine dehydrating zone a liquid phase consisting essentially of said dehydrating agent and absorbed water and leaving a gas phase consisting essentially of anhydrous chlorine, passing said liquid phase from said chlorine dehydrating zone to said extractive distillation zone to be used therein as said auxiliary solvent emanating from within the system, and passing anhydrous hydrogen chloride from said stripping and extractive distillation zones to said reaction zone.

2. The process in accordance with claim 1 wherein said dehydrating agent is a concentrated aqueous solution of calcium chloride.

3. The process in accordance with claim 1 wherein said metal having an atomic number of from 21 to 30 is copper.

AVA J. JOHNSON.
ALEXANDER J. CHERNIAVSKY.

REFERENCES CITED

The following references are of record in the file of this patent:

UNITED STATES PATENTS

| Number | Name | Date |
| --- | --- | --- |
| 118,212 | Deacon | Aug. 22, 1871 |
| 2,204,172 | Balcar | June 11, 1940 |
| 2,299,427 | Rosenstein | Oct. 20, 1942 |
| 2,357,095 | Evans et al. | Aug. 29, 1944 |
| 2,436,870 | Murphree | Mar. 2, 1948 |